(12) United States Patent
Emori

(10) Patent No.: US 8,345,277 B2
(45) Date of Patent: Jan. 1, 2013

(54) PRINT-ITEM SETTING SERVER APPARATUS, PRINT-ITEM SETTING METHOD, AND COMPUTER PROGRAM PRODUCT

(75) Inventor: Mototsugu Emori, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 947 days.

(21) Appl. No.: 12/400,335

(22) Filed: Mar. 9, 2009

(65) Prior Publication Data

US 2009/0225366 A1  Sep. 10, 2009

(30) Foreign Application Priority Data

Mar. 10, 2008 (JP) .................................. 2008-060158

(51) Int. Cl.
*G06K 15/00* (2006.01)
*G06K 1/00* (2006.01)
*G06F 15/00* (2006.01)
*G06F 3/12* (2006.01)

(52) U.S. Cl. ...... 358/1.14; 358/1.6; 358/1.13; 358/1.15; 358/1.16; 358/1.18

(58) Field of Classification Search .................. 358/1.6, 358/1.13–1.18
See application file for complete search history.

(56) References Cited

U.S. PATENT DOCUMENTS

| 7,693,968 B2* | 4/2010 | Aritomi | 709/221 |
| 7,760,382 B2* | 7/2010 | Murata | 358/1.15 |
| 2005/0044200 A1 | 2/2005 | Aritomi | |
| 2007/0229873 A1* | 10/2007 | Kato | 358/1.14 |
| 2008/0098303 A1 | 4/2008 | Murayama | |

FOREIGN PATENT DOCUMENTS

| JP | 3586588 | 8/2004 |
| JP | 2006-74601 | 3/2006 |
| JP | 2006-195811 | 7/2006 |
| JP | 3876607 | 11/2006 |
| JP | 2007-58744 | 3/2007 |
| JP | 2007-122520 | 5/2007 |
| JP | 2007-179197 | 7/2007 |
| JP | 4052554 | 12/2007 |
| WO | WO2006/025590 A1 | 3/2006 |

OTHER PUBLICATIONS

European Search Report of Nov. 26, 2009 in connection with counterpart European application No. 09 25 0664.
Dec. 13, 2011 Japanese official action in connection with a counterpart Japanese patent application.

* cited by examiner

*Primary Examiner* — Twyler Haskins
*Assistant Examiner* — Jonathan Beckley
(74) *Attorney, Agent, or Firm* — Cooper & Dunham LLP

(57) ABSTRACT

A print server receives a transmission request and a printer ID from a client device, acquires print function information corresponding to the printer ID from print-function information DBs, and acquires function restriction information from a function-restriction information DB of a printer control server. The print server then generates setting screen information based on the print function information and the function restriction information, and transmits the setting screen information to the client device. The client device receives the setting screen information, and creates and displays a setting screen by using the setting screen information.

17 Claims, 17 Drawing Sheets

FIG. 2

| PRINTER ID | MODEL NAME | PRINT SERVER URI |
|---|---|---|
| P001 | IP SiO CX3000 | http://ps1.ricoh.co.jp/pf |
| P002 | Imagio Neo C455 | http://ps2.ricoh.co.jp/pf |
| ⋮ | ⋮ | ⋮ |

FIG. 3

| USER ID | USER NAME | GROUP ID |
|---|---|---|
| U001 | YAMADA | G001 |
| U002 | SUZUKI | G002 |
| U003 | SATO | G002 |
| ⋮ | ⋮ | ⋮ |

FIG. 4

| GROUP ID | GROUP NAME |
|---|---|
| G001 | SALES |
| G002 | DEVELOPMENT |
| ⋮ | ⋮ |

FIG. 5

| CLIENT ID | CLIENT TYPE |
|---|---|
| C001 | PC |
| C002 | MOBILE PHONE |
| C003 | PC |
| ⋮ | ⋮ |

FIG. 6

| PRINTER ID | PRINT-FUNCTION RESTRICTION INFORMATION |
|---|---|
| * | SIDES: ONLY DUPLEX |
| P001 | -- |
| P002 | NUMBER OF COPIES: UP TO 100 |
| ⋮ | ⋮ |

FIG. 7

| USER ID | PRINTER ID | PRINT-FUNCTION RESTRICTION INFORMATION |
|---|---|---|
| U001 | * | SIDES: ONLY DUPLEX |
| U002 | * | NUMBER OF COPIES: UP TO 30 |
| U003 | * | NUMBER OF COPIES: UP TO 100 |
| ⋮ | ⋮ | ⋮ |

FIG. 8

| GROUP ID | PRINTER ID | PRINT-FUNCTION RESTRICTION INFORMATION |
|---|---|---|
| G001 | * | SIDES: ONLY DUPLEX |
| G002 | P002 | NUMBER OF COPIES: UP TO 50 |
| ⋮ | ⋮ | ⋮ |

FIG. 9

| CLIENT TYPE | PRINTER ID | PRINT-FUNCTION RESTRICTION INFORMATION |
|---|---|---|
| PC | P001 | NUMBER OF COPIES: UP TO 200 |
| MOBILE PHONE | P002 | NUMBER OF COPIES: UP TO 10 |
| ⋮ | ⋮ | ⋮ |

FIG. 10

| PRINTER ID | MODEL NUMBER | OPTIONAL EQUIPMENT |
|---|---|---|
| P001 | CX3000 | DUPLEXER |
| P002 | NeoC455 | — |
| ⋮ | ⋮ | ⋮ |

FIG. 11

| MODEL NUMBER | BASIC PRINT FUNCTION |
|---|---|
| CX3000 | NUMBER OF COPIES, COLOR |
| NeoC455 | NUMBER OF COPIES, COLOR, SIDES |
| ⋮ | ⋮ |

FIG. 12

| MODEL NUMBER | OPTIONAL EQUIPMENT | OPTIONAL PRINT FUNCTION |
|---|---|---|
| CX3000 | DUPLEXER | SIDES |
| NeoC455 | FINISHER | STAPLING |
| ⋮ | ⋮ | ⋮ |

FIG. 13

| PRINT FUNCTION | SET VALUE |
|---|---|
| NUMBER OF COPIES | 1 |
| COLOR | COLOR |
| SIDES | SINGLE |
| ⋮ | ⋮ |

FIG. 14

| PRINT FUNCTION | SET VALUE |
|---|---|
| NUMBER OF COPIES | 60 |
| COLOR | MONOCHROME |
| SIDES | SINGLE |
| ⋮ | ⋮ |

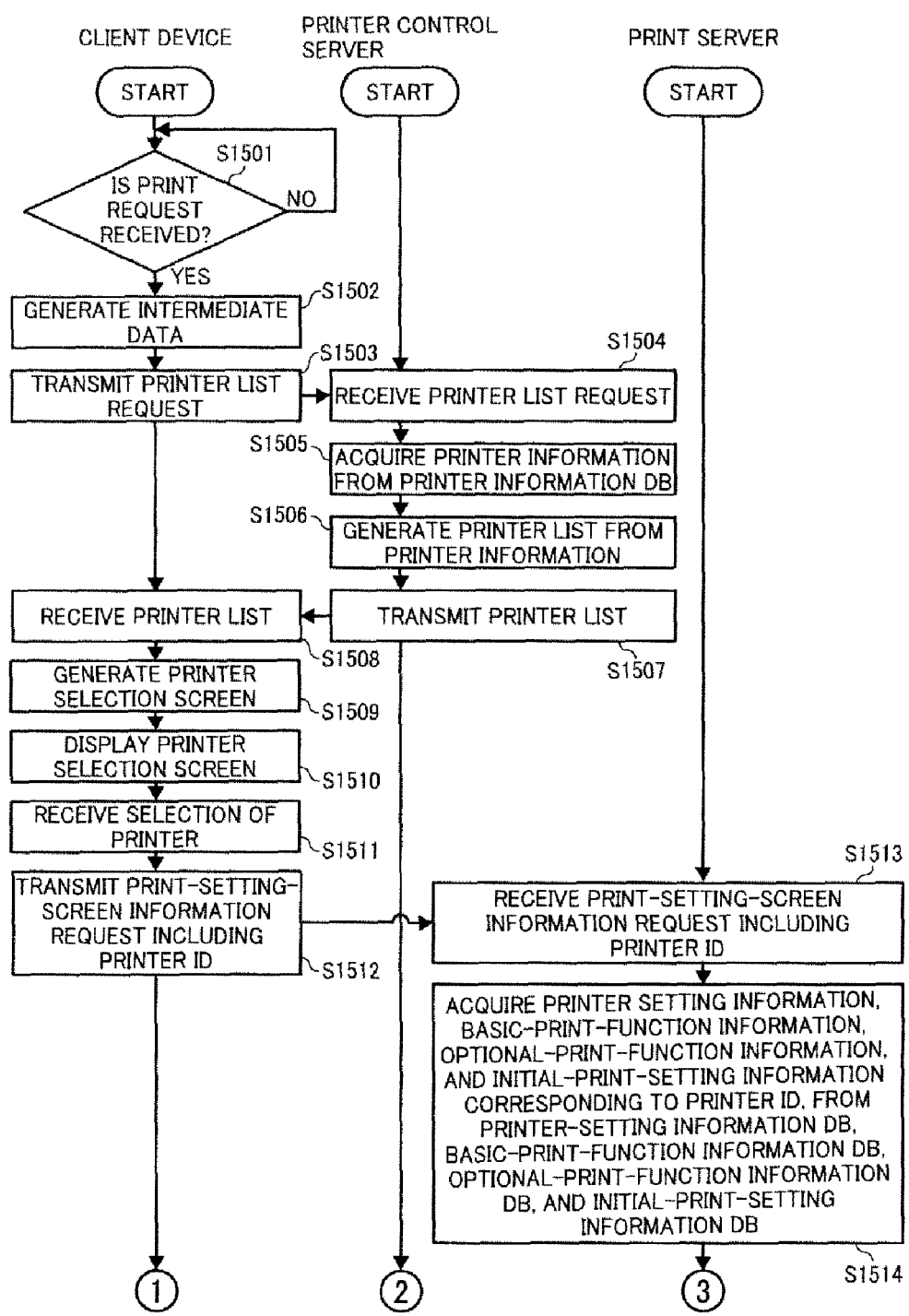

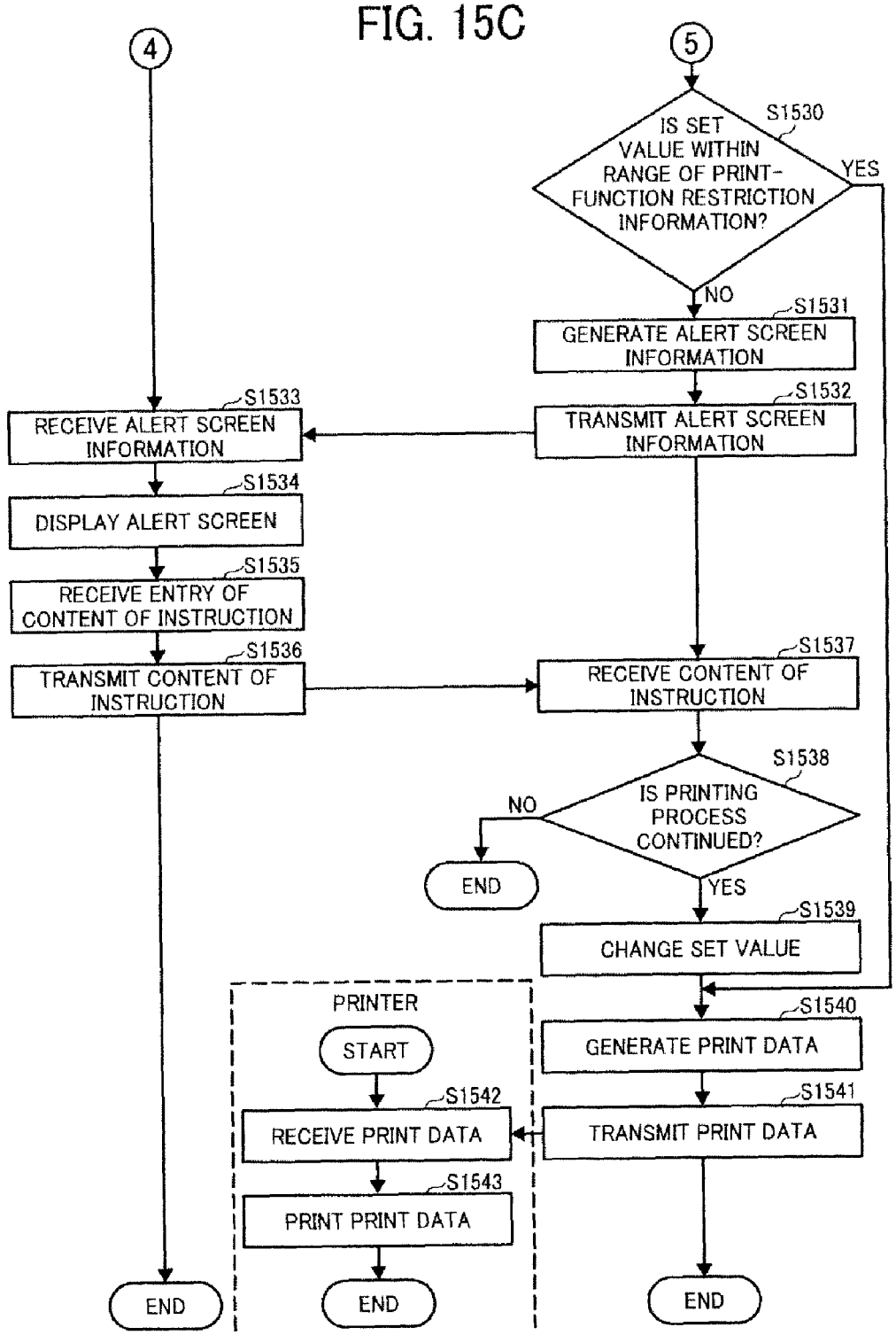

FIG. 16

```xml
<?xml version="1.0" encoding="Shift_JIS" ?>
<window title="Print Settings">
        <spinner label='NUMBER OF COPIES'
                var='copies'
                min='1'
                max='1000'>
                <value> 1 </value>
        </spinner>
        <list label='COLOR'
                var='color'>
                <value>color</value>
                <option label='COLOR'>
                        <value>color</value>
                </option>
                <option label='MONOCHROME'>
                        <value>mono</value>
                </option>
        </list>
        </list label='SIDES'
                var='sides'>
                <value>single</value>
                <option label='SINGLE'>
                        <value>single</value>
                </option>
                <option label='DUPLEX'>
                        <value>duplex</value>
                </option>
        </list>
</window>
```

FIG. 17

```xml
<?xml version="1.0" encoding="Shift_JIS"?>
<window title="Print Settings">
          <spinner label='NUMBER OF COPIES'
                    var='copies'
                    min='1'
                    max='1000'>
                    <value> 60 </value>
          </spinner>
          <list label='COLOR'
                    var='color'>
                    <value>mono</value>
                    <option label='COLOR'>
                              <value>color</value>
                    </option>
                    <option label='MONOCHROME'>
                              <value>mono</value>
                    </option>
          </list>
          <list label='SIDES'
                    var='sides'>
                    <value>single</value>
                    <option label='SINGLE'>
                              <value>single</value>
                    </option>
                    <option label='DUPLEX'>
                              <value>duplex</value>
                    </option>
          </list>
</window>
```

FIG. 18

```xml
<?xml version="1.0" encoding="Shift_JIS"?>
<window title="Print Settings" >
        <spinner label='NUMBER OF COPIES'
                 var='copies'
                 min='1'
                 max='50'>
                <value> 50 </value>
        </spinner>
        <list label='COLOR'
              var='color' >
                <value>mono</value>
                <option label='COLOR'>
                        <value>color</value>
                </option>
                <option label='MONOCHROME' >
                        <value>mono</value>
                </option>
        </list>
        <list label='SIDES'
              var='sides' >
                <value>duplex</value>
                <option label='SINGLE'>
                        <value>single</value>
                </option>
                <option label='DUPLEX'>
                        <value>duplex</value>
                </option>
        </list>
</window>
```

FIG. 19

```html
<html>
<title>Print Settings</title>
<script type="text/javascript">
<!--
function check(){
    var copies=document.getElementById("copies");
    if(copies.value.match(/[^0-9]+/)){
        window.alert('VALUE OTHER THAN NUMBER IS ENTERED');
        return false;
    }else if(eval(copies.value)>50){
        window.alert('PRINTING IS RESTRICTED TO LESS THAN 50 COPIES');
        return false;
    }else{
        return true;
    }
}
//-->
</script>
<body>
<form method="POST" action="http://localhost:8080" onSubmit="return check()">
NUMBER OF COPIES:<input type="text" name="copies" value="50" id="copies" /><br/>
COLOR:<select name="color">
    <option value="color">COLOR</option>
    <option value="mono" selected>MONOCHROME</option>
</select><br/>
SIDES:<select name="sides">
    <option value="single">SINGLE</option>
    <option value="duplex" selected>DUPLEX</option>
</select><br/>
<input type="hidden" name="ps" value="http://ps1.ricoh.co.jp/print" />
<input type="submit" value="TRANSMIT" />
</form>
</body>
</html>
```

FIG. 25

```
<html>
<title>Print Settings</title>
<script type="text/javascript">
<!--
function check(){
    var copies=document.getElementById("copies");
    if(copies.value.match(/[^0-9]+/)){
        window.alert('VALUE OTHER THAN NUMBER IS ENTERED');
        return false;
    }else if(eval(copies.value)>50){
        window.alert('PRINTING IS RESTRICTED TO LESS THAN 50 COPIES');
        return false;
    }else{
        return true;
    }
}
//-->
</script>
<body>
<form method="POST" action="http://ps1.ricoh.co.jp/print" onSubmit="return check()">

URL:<input type="text" name="url" /><br/>
NUMBER OF COPIES<input type="text" name="copies" value="50" id="copies" /><br/>

COLOR:<select name="color">
    <option value="color">COLOR</option>
    <option value="mono" selected>MONOCHROME</option>
</select><br/>
SIDES:<select name="sides" >
    <option value="single">SINGLE</option>
    <option value="duplex" selected>DUPLEX</option>
</select><br/>
<input type="submit" value="TRANSMIT" />

</form>
</body>
</html>
```

PRINT-ITEM SETTING SERVER APPARATUS, PRINT-ITEM SETTING METHOD, AND COMPUTER PROGRAM PRODUCT

CROSS-REFERENCE TO RELATED APPLICATIONS

The present application claims priority to and incorporates by reference the entire contents of Japanese priority document 2008-060158 filed in Japan on Mar. 10, 2008.

BACKGROUND OF THE INVENTION

1. Field of the Invention

The present invention relates to a print-item setting server apparatus, a print-item setting method, and a computer program product.

2. Description of the Related Art

Conventionally, when document data is to be printed from a client device in a document management system built in offices, there is generally known a technology of generating print data based on set values for various setting items selected from a print setting screen and printing (outputting) the generated print data with a printer. The print setting screen is displayed on a display device of the client device is provided as a function of a printer driver which corresponds to the printer. Therefore, setting items are uniformly arranged in the print setting screen which makes improvement in the usability, for example, changing the layout of the print setting screen depending on the document to be printed, difficult.

Japanese Patent Application Laid-open No. 2006-74601 discloses a document management system that in which it is possible to changes the print setting screen for each document to be printed or for each folder in which the document is registered. This document management system stores therein setting items and display items on the print setting screen for each document, or for each folder in which the document is registered, and displays a print setting screen by using the stored setting items and display items.

In the technology described in Japanese Patent Application Laid-open No. 2006-74601, although a print setting screen can be changed separately for each client device, it is not possible to change a print setting screen integrally for two or more client devices.

SUMMARY OF THE INVENTION

It is an object of the present invention to at least partially solve the problems in the conventional technology.

According to an aspect of the present invention, there is provided a server apparatus that is connectable to a client decide via a network, the client device being connectable to a printer via a network. The server apparatus including a print-function storage unit that stores therein in associated manner first printer identification information for uniquely identifying the printer and first print function information including a set value for a print item that can be set by the printer; a function-restriction storage unit that stores therein first function restriction information indicating an allowable range of values of the set value; a first receiving unit that receives a transmission request and second printer identification information from the client device, the transmission request being a request for transmitting setting screen information to the client device, the second printer identification information being information for uniquely indentifying a printer, the client device being a device that receives input of a print instruction for printing certain data on the printer and input of a set value for a print item; an acquiring unit that acquires second print function information from among the first print function information in the print-function storage unit that corresponds to the second printer identification information and acquires second function restriction information from among the first function restriction information in the function-restriction storage unit in response to the transmission request received by the first receiving unit; a screen generating unit that generates setting screen information based on the second print function information and the second function restriction information; and a first transmitting unit that transmits generated setting screen information to the client device.

According to another aspect of the present invention, there is provided a print-item setting method implemented in a printing system. The printing system including a printer; a client device that receives input of a print instruction for printing certain data on the printer connectable via a network and input of a set value for a print item; and a server apparatus connectable to the client device via a network. The server apparatus including a print-function storage unit that stores therein in associated manner first printer identification information for uniquely identifying the printer and first print function information including a set value for a print item that can be set by the printer; and a function-restriction storage unit that stores therein first function restriction information indicating an allowable range of values of the set value. The print-item setting method including, in the server apparatus, first receiving including receiving a transmission request and second printer identification information from the client device, the transmission request being a request for transmitting setting screen information used to display a screen for setting the set value; first acquiring including acquiring second print function information from among the first print function information in the print-function storage unit that corresponds to the second printer identification information and acquiring second function restriction information from among the first function restriction information in the function-restriction storage unit in response to the transmission request received at the first receiving; first generating including generating setting screen information based on the second print function information and the second function restriction information; and first transmitting including transmitting the setting screen information generated at the first generating to the client device. And, in the client device, tenth receiving including receiving the setting screen information from the server apparatus; and tenth displaying including displaying a setting screen using the setting screen information received at the tenth receiving.

According to still another aspect of the present invention, there is provided a computer program product that includes a computer-readable recording medium that stores therein a computer program, including a plurality of computer-executable instructions, that causes a computer to execute the instructions. The computer including a print-function storage unit that stores therein in associated manner first printer identification information for uniquely identifying the printer and first print function information including a set value for a print item that can be set by the printer; and a function-restriction storage unit that stores therein first function restriction information indicating an allowable range of values of the set value. The computer program causing the computer to execute first receiving including receiving a transmission request and second printer identification information from a client device, the transmission request being a request for transmitting setting screen information used to display a screen for setting the set value, the client device connectable to a printer that prints print data through a network, and receives a print instruction for the printer and input of set value for the print item; first acquiring including acquiring second print function information from among the first print function information in the print-function storage unit that corresponds to the second printer identification information and acquiring second function restriction information from among the first function restriction information in the function-restriction storage unit in response to the transmission request received at the first receiving; first generating including generating setting screen information based on the second print function information and the second function restriction information; and first transmitting including transmitting the setting screen information generated at the first generating to the client device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is depicts an example of a data structure of a printer information database;

FIG. 3 is depicts an example of a data structure of a user information database;

FIG. 4 is depicts an example of a data structure of a group information database;

FIG. 5 is depicts an example of a data structure of a client information database;

FIG. 6 is depicts an example of a data structure of a printer-specific print-function restriction information database;

FIG. 7 is depicts an example of a data structure of a user-specific print-function restriction information database;

FIG. 8 is depicts an example of a data structure of a group-specific print-function restriction information database;

FIG. 9 is depicts an example of a data structure of a client-type print-function restriction information database;

FIG. 10 is depicts an example of a data structure of a printer-setting information database;

FIG. 11 depicts an example of a data structure of a basic-print-function information database;

FIG. 12 depicts an example of a data structure of an optional-print-function information database;

FIG. 13 depicts an example of a data structure of an initial-print-setting information database;

FIG. 14 depicts an example of a data structure of a print-history information database;

FIGS. 15A to 15C are flowcharts of printing processes performed by a client device, a printer control server, a print server, and a printer;

FIG. 16 is a schematic for explaining an example of print function information using initial-print-setting information;

FIG. 17 is a schematic for explaining an example of print function information using print history information;

FIG. 18 is a schematic for explaining an example of print function information reflecting print-function restriction information;

FIG. 19 is a schematic for explaining an example of print-setting-screen information;

FIG. 25 is a schematic for explaining an example of print-setting-screen information.

DETAILED DESCRIPTION OF THE PREFERRED EMBODIMENTS

Exemplary embodiments of the present invention are explained in detail below with reference to the accompanying drawings. It should be noted that the present invention is not limited to the embodiments.

Figure 1:
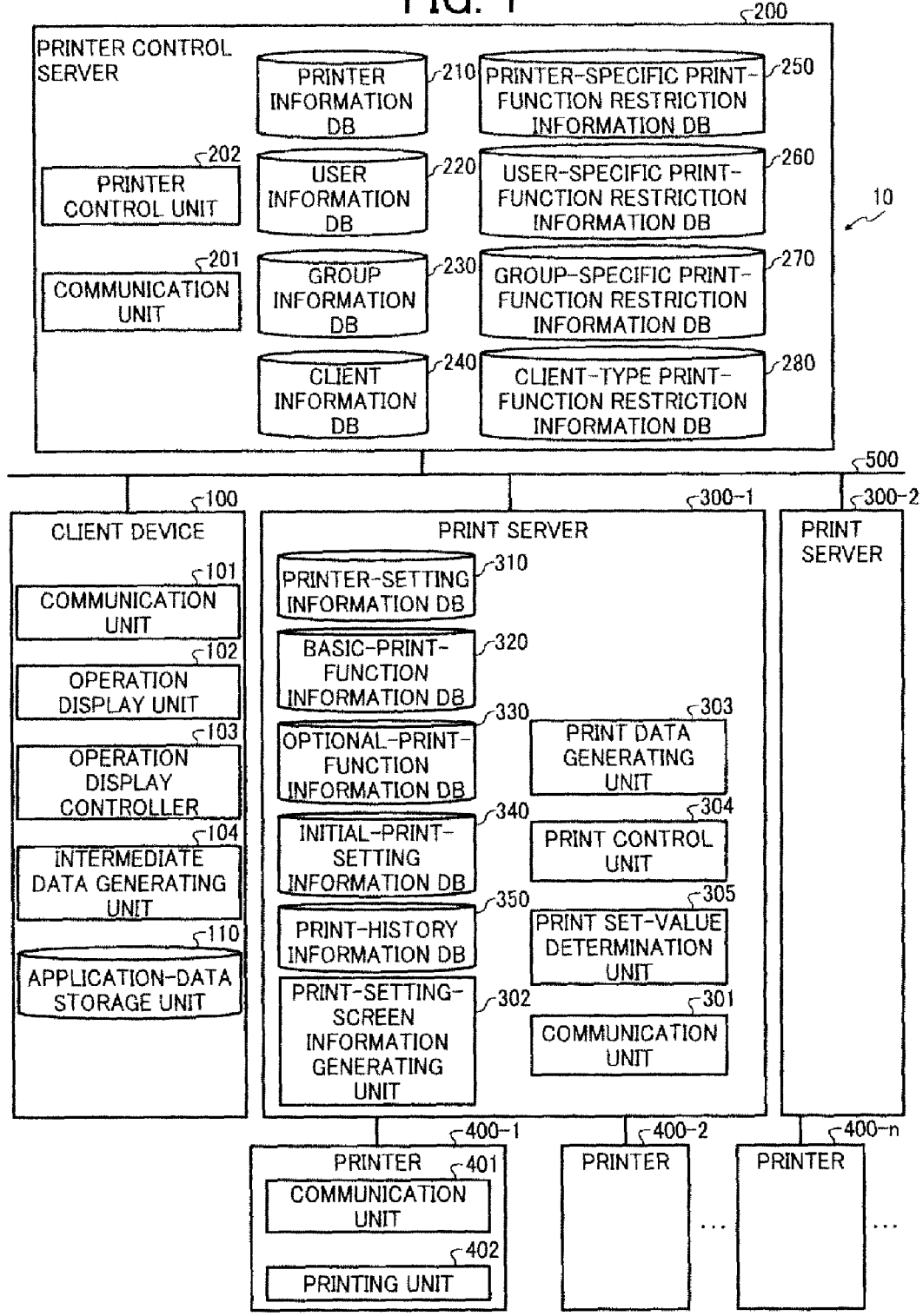
FIG. 1 is a block diagram of a printing system according to a first embodiment of the present invention.

FIG. 1 is a block diagram of a printing system 10 according to a first embodiment of the present invention.

The printing system 10 includes a client device 100, a printer control server 200, print servers 300-1 and 300-2 (hereinafter, "print server 300"), and printers 400-1, 400-2, . . . 400-n (hereinafter, "printer 400"). An arbitrary one of the print servers 300-1 and 300-2 will be referred to as a print server 300, and arbitrary one of the printers 400-1, 400-2, . . . 400-n will be referred to as a printer 400". The client device 100, the printer control server 200, and the print server 300 are connected to each other through a network 500. The print server 300 and the printer 400 may be connected to each other with a cable or the like, or may be connected to each other with a network such as a local area network (LAN). Although the printer control server 200 and the print server 300 are illustrated as separate devices, then may be integrated in one device.

Although only one client device 100 is illustrated, there can be more than one client devices 100. The client device 100 includes a communication unit 101, an operation display unit 102, an operation display controller 103, an intermediate data generating unit 104, and an application-data storage unit 110.

The operation display unit 102 is operated during operation of an application program, and receives an instruction for printing displayed application data and selection of a printer from a printable printer list. The application data is data that can be printed by the printer 400, which is any one of various types of data such as picture data, text data, and image data, and a combination of these, in addition to document data. The operation display unit 102 displays a print setting screen according to the selected printer, and receives an entry of a set value for a setting item through the displayed print setting screen. Specifically, the operation display unit 102 is a display device and an input device such as a display monitor, a keyboard, and a mouse.

The operation display controller 103 controls the operation display unit 102 to acquire display information displayed by the operation display unit 102 and input information received thereby.

The communication unit 101 transmits and receives data to and from the printer control server 200 and the print server 300. The communication unit 101 receives the list of printers that can print data according to a print instruction received by the operation display unit 102, from the printer control server 200. The communication unit 101 also receives the print-setting-screen information reflecting the selected printer 400 and the function restriction information, from the print server 300. Furthermore, the communication unit 101 transmits a set value for a print setting item entered through the operation display unit 102 and also intermediate data generated from the document data by the intermediate data generating unit 104, to the print server 300.

The intermediate data generating unit 104 generates intermediate data from application data of which printing is instructed. The intermediate data is data in a general-purpose data format, which can be converted to print data by a printer driver according to a set value related to the print function. Specifically, the intermediate data includes data described in a page description language (PDL) such as PostScript and data in a Portable Document Format (PDF).

The application-data storage unit 110 stores therein application data. The stored application data is read from an application program operating in a controller (not shown) and displayed on the operation display unit 102.

Next, the configuration of the printer control server 200 is explained below. The printer control server 200 includes a communication unit 201, a printer control unit 202, a printer information database (DB) 210, a user information DB 220, a group information DB 230, a client information DB 240, a printer-specific print-function restriction information DB 250, a user-specific print-function restriction information DB 260, a group-specific print-function restriction information DB 270, and a client-type print-function restriction information DB 280.

The communication unit 201 transmits and receives data to and from the client device 100 and the print server 300. The communication unit 201 transmits a printer list to the client device 100 according to a printer list request sent therefrom, and also transmits print-function restriction information to the print server 300 according to a request for the print-function restriction information sent therefrom.

The printer control unit 202 acquires printer information from the printer information DB 210 according to a printer list request received by the communication unit 201, and generates the printer list. The printer control unit 202 acquires print-function restriction information from the printer-specific print-function restriction information DB 250, the user-specific print-function restriction information DB 260, the group-specific print-function restriction information DB 270, and the client-type print-function restriction information DB 280, according to the request for the print-function restriction information received by the communication unit 201.

The printer information DB 210 stores therein information for printers which can be specified from the client device 100. FIG. 2 is a diagram for explaining an example of a data structure of the printer information DB 210. The printer information DB 210 stores therein printer identification data (ID) which is information for identifying each printer, a model name, and a print server uniform resource identifier (URI) which is an address of the print server 300, on a network, connected with the printer 400 corresponding to each printer ID, in association with one another. The printer information DB 210 may further store printer information for each user ID and for each client ID which is information for identifying the client device 100, so that a different printer can be specified for each user or each client device.

The user information DB 220 stores therein information for users. FIG. 3 is a diagram for explaining an example of a data structure of the user information DB 220. The user information DB 220 stores therein a user ID, a user name, and a group ID for identifying a group to which the user belongs, in association with one another.

The group information DB 230 stores therein information for groups. FIG. 4 is a diagram for explaining an example of a data structure of the group information DB 230. The group information DB 230 stores therein a group ID and a group name in association with each other.

The client information DB 240 stores therein information for the client devices 100. FIG. 5 is a diagram for explaining an example of a data structure of the client information DB 240. The client information DB 240 stores therein a client ID and a client type in association with each other. The client type mentioned here represents a type of client device 100 that issues a print instruction, and types specifically stored therein are "personal computer (PC)", "mobile phone", and the like.

The printer-specific print-function restriction information DB 250 stores therein information related to restrictions of print functions set for each printer. FIG. 6 is a diagram for explaining an example of a data structure of the printer-specific print-function restriction information DB 250. The printer-specific print-function restriction information DB 250 stores therein a printer ID and print-function restriction information in association with each other.

The print-function restriction information mentioned here represents information indicating a range of a set value which can be set for each print item, and includes printer-specific print-function restriction information, user-specific print-function restriction information, group-specific print-function restriction information, and client-type print-function restriction information.

The print-function restriction information allows setting of such restrictions as "only duplex" for a print item "sides" indicating on which side of paper is printed, and "up to 100" for a print item "number of copies". If a sign "*" (wild card) is stored in the printer ID, print-function restriction information common in all printers can be stored therein. As shown in FIG. 6, when "up to 100" for the print item "number of copies" is stored in printer ID "P002", by specifying the printer 400 indicated in the printer ID "P002", two restrictions: "only duplex" for the print item "sides" and "up to 100" for the print item "number of copies" are applied.

The print-function restriction information can store therein not only the range of the set value which can be set but also a set value preferentially set when no setting is performed by the user. For example, when "duplex priority" is stored in the print item "sides", "duplex" is set if the user does not set any set value in the print item "sides".

The user-specific print-function restriction information DB 260 stores therein information related to restrictions of print functions set for each user and each printer. FIG. 7 is a diagram for explaining an example of a data structure of the user-specific print-function restriction information DB 260. The user-specific print-function restriction information DB 260 stores therein the user ID, the printer ID, and print-function restriction information in association with one another, and can also store print-function restriction information corresponding to each user and each printer respectively. By storing "*" in a printer ID corresponding to a user ID "U001", one common print-function restriction information is set even if the user with the user ID "U001" selects any printer 400.

The group-specific print-function restriction information DB 270 stores therein information related to restrictions of print functions set for each group and each printer. FIG. 8 is a diagram for explaining an example of a data structure of the group-specific print-function restriction information DB 270. The group-specific print-function restriction information DB 270 stores therein the group ID, the printer ID, and print-function restriction information in association with one another, and can also store print-function restriction information corresponding to each group and each printer respectively. Furthermore, by storing "*" in a printer ID corresponding to a group ID "G001", for example, one common print-function restriction information is set even if any one of users who belong to the group selects any printer 400.

The client-type print-function restriction information DB 280 stores therein information related to restrictions of print functions set for each client type and each printer. FIG. 9 is a diagram for explaining an example of a data structure of the client-type print-function restriction information DB 280. The client-type print-function restriction information DB 280 stores therein the client type, the printer ID, and print-function restriction information in association with one another, and can also store print-function restriction information corresponding to each client type and each printer respectively. Furthermore, by storing "*" in a printer ID corresponding to the client type "PC", one common print-function restriction information can be set even if any one of client devices of the client type "PC" selects any printer 400.

Next, the configuration of the print server 300 is explained below. One or a plurality of print servers 300 are connected to the network 500. Each of the print servers 300 includes a communication unit 301, a print-setting-screen information generating unit 302, a print data generating unit 303, a print control unit 304, a print-set-value determination unit 305, a printer-setting information DB 310, a basic-print-function information DB 320, an optional-print-function information DB 330, an initial-print-setting information DB 340, a print-history information DB 350, and a setting-screen information storage unit (DB) (not shown).

The communication unit 301 transmits and receives data to and from the print server 300, the client device 100, and the printer control server 200. The communication unit 301 transmits print-setting-screen information according to a request for the print-setting-screen information sent from the client device 100. The communication unit 301 receives intermediate data and a set value for a print item from the client device 100, transmits alert on the received set value to the client device 100, or transmits the intermediate data and the set value to the printer 400.

The print-setting-screen information generating unit 302 generates print-setting-screen information based on print function information corresponding to a selected printer acquired from the printer-setting information DB 310, the basic-print-function information DB 320, and the optional-print-function information DB 330, and also based on print-function restriction information received from the printer control server 200. It is noted that the print-setting-screen information may be stored in a storage unit (not shown) for each printer.

The print-set-value determination unit 305 determines whether the set value received from the client device 100 is within a range of the print-function restriction information. When it is determined that the set value is not within the range of the print-function restriction information, the print-set-value determination unit 305 generates alert screen information displaying a message indicating that the set value is not within the range thereof and a message prompting the user to instruct whether the printing process of the print data is continued.

The print control unit 304 controls processes whether the printing process is cancelled or the printing process is requested to the printer 400 by changing the set value, according to the content of an instruction for the alert screen information received from the client device 100.

The print data generating unit 303 generates print function information from the printer setting information, the basic-print-function information, the optional-print-function information, and the initial-print-setting information. The print data generating unit 303 also generates print function information reflecting the print-function restriction information. Further, the print data generating unit 303 generates print data from the intermediate data and the set value received from the client device 100. It is noted that the print data generating unit 303 generates the print data using the printer driver corresponding to the printer 400 specified for printing.

The printer-setting information DB 310 stores therein information for the printer 400. FIG. 10 is a diagram for explaining an example of a data structure of the printer-setting information DB 310. The printer-setting information DB 310 stores therein the printer ID, a model number, and optional equipment provided in the printer 400 in association with one another.

The basic-print-function information DB 320 stores therein basic-print-function information corresponding to the model number of the printer 400. The print function information mentioned here represents information for print functions provided in each printer, and includes the basic-print-function information and the optional-print-function information. FIG. 11 is a diagram for explaining an example of a data structure of the basic-print-function information DB 320. The basic-print-function information DB 320 stores therein the model number and the basic print function in association with each other.

The optional-print-function information DB 330 stores therein optional-print-function information corresponding to the model number of the printer 400. FIG. 12 is a diagram for explaining an example of a data structure of the optional-print-function information DB 330. The optional-print-function information DB 330 stores therein the model number, optional equipment, and the optional print function in association with one another.

The initial-print-setting information DB 340 stores therein a set value set as an initial value for each setting item related to the print functions. FIG. 13 is a diagram for explaining an example of a data structure of the initial-print-setting information DB 340. The initial-print-setting information DB 340 stores therein the print function and the set value in association with each other.

The print-history information DB 350 stores therein a set value, as print history information, set for each setting item related to the print functions. FIG. 14 is a diagram for explaining an example of a data structure of the print-history information DB 350. The print-history information DB 350 stores therein the print function and the set value in association with each other. It is noted that the print-history information DB 350 also stores therein at least a previous set value.

Next, the configuration of the printer 400 is explained below. The printer 400 is connected to the print server 300, and includes a communication unit 401 and a printing unit 402. The communication unit 401 receives print data from the print server 300, and the printing unit 402 prints the received print data.

Figure 15B:
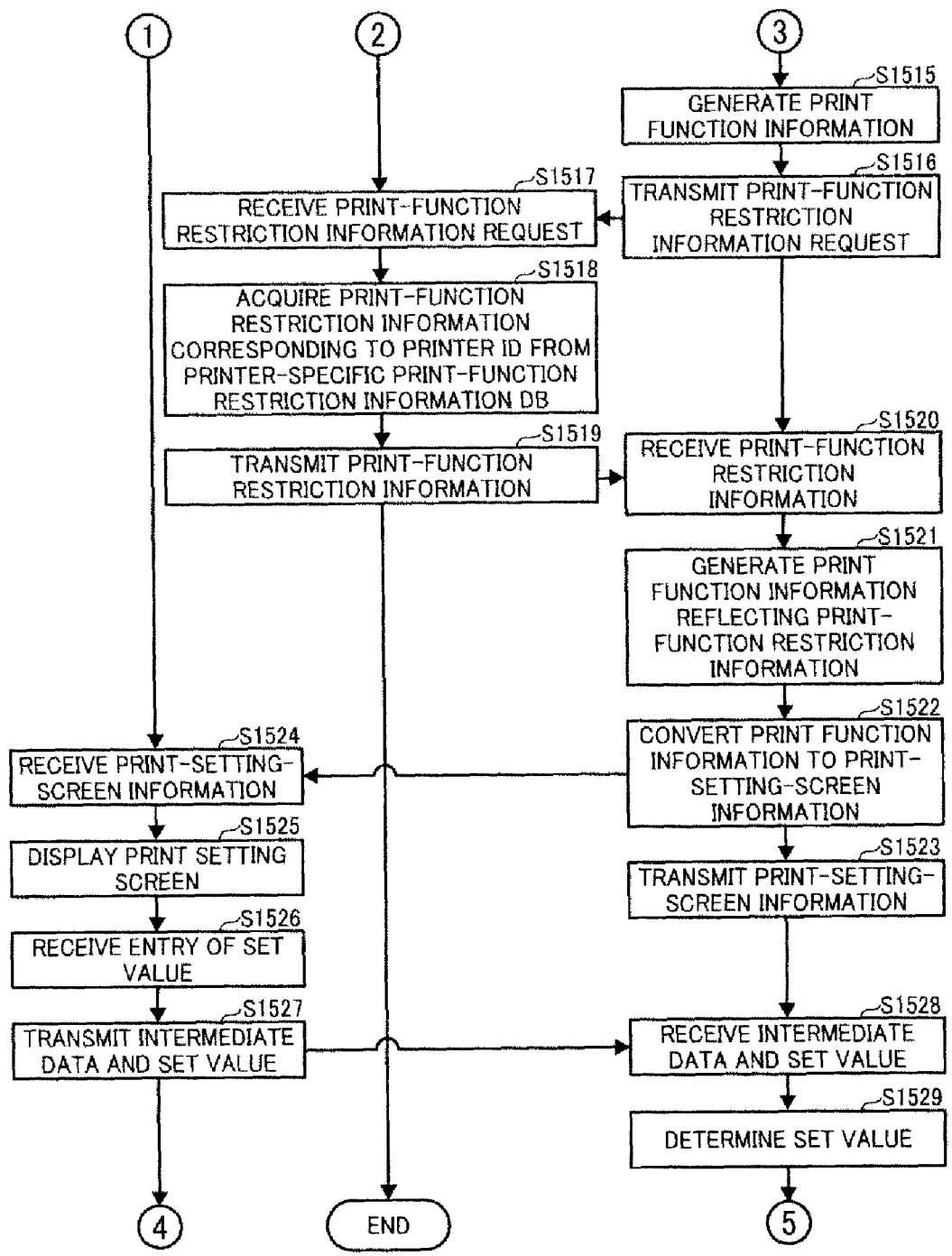

The printing process performed by the printing system 10 configured in the above manner is explained below. FIGS. 15A to 15C are flowcharts of printing processes performed by the client device 100, the printer control server 200, the print server 300, and the printer 400. It is noted that the client device 100 executes an application program and displays application data according to the application program on the operation display unit 102.

First, in the client device 100, the operation display unit 102 determines whether the print request is received (Step S1501). When it is determined that the print request is not received (NO at Step S1501), the process control returns to Step S1501.

When it is determined that the print request is received (YES at Step S1501), the intermediate data generating unit 104 generates intermediate data from the application data (Step S1502). Next, the communication unit 101 transmits a printer list request for requesting a list of printers that can be specified by the client device 100 to the printer control server 200 (Step S1503). It is noted that the communication unit 101 may transmit the printer list request including the user ID and the client ID to the printer control server 200, and the printer control server 200 may transmit the print list according to the user ID and the client ID thereto.

In the printer control server 200, the communication unit 201 receives the printer list request (Step S1504). The printer control unit 202 acquires printer information from the printer information DB 210 (Step S1505), and generates a printer list from the acquired printer information (Step S1506). The communication unit 201 transmits the generated printer list to the client device 100 (Step S1507).

In the client device 100, the communication unit 101 receives the printer list from the printer control server 200 (Step S1508). The operation display controller 103 generates a printer selection screen (Step S1509), and displays it on the operation display unit 102 (Step S1510). Model names are displayed on the printer selection screen and one of them is selected, and the printer ID and the print server URI corresponding to the selected model name are thereby acquired. The operation display controller 103 receives the selection of the printer (Step S1511). The communication unit 101 transmits a print-setting-screen information request including the printer ID to the print server 300 indicated by the print server URI (Step S1512). It is noted that the communication unit 101 may transmit the print-setting-screen information request including the user ID and the client ID in addition to the printer ID thereto. The print-setting-screen information request also includes data-format information for the print-setting-screen information specified by the user or data-format information for the print-setting-screen information stored in a storage unit (not shown). The data-format information for the print-setting-screen information is specified, so that the print server 300 generates the print-setting-screen information in the specified data format.

In the print server 300, the communication unit 301 receives the print-setting-screen information request including the printer ID (Step S1513). The print control unit 304 acquires printer setting information, basic-print-function information, optional-print-function information, and initial-print-setting information corresponding to the printer ID from the printer-setting information DB 310, the basic-print-function information DB 320, the optional-print-function information DB 330, and the initial-print-setting information DB 340 (Step S1514). The print data generating unit 303 generates print function information from the printer setting information, the basic-print-function information, the optional-print-function information, and the initial-print-setting information (Step S1515).

FIG. 16 is a schematic for explaining an example of print function information using the initial-print-setting information. For example, as the initial-print-setting information, when values of print items such as the number of copies="1", color="color", and sides="single" are acquired, print function information is generated as an Extensible Markup Language (XML) file as shown in FIG. 16. Document Object Model (DOM), Simple API for XML (SAX), and XML Stylesheet Language Transformations (XSLT) are used for XML text conversion. It is noted that the print server 300 may previously generate print function information in which initial-print-setting information is set for each printer and store it in the storage unit, and may acquire the print function information corresponding to the printer ID from the storage unit.

FIG. 17 is a schematic for explaining an example of print function information using the print history information. The print function information shown in FIG. 17 is generated using print history information, instead of the initial-print-setting information, corresponding to the user ID and the client ID stored in the print-history information DB 350. For example, when the print history information has set values such as the number of copies="60", color="monochrome", and sides="single" as shown in FIG. 14, the print data generating unit 303 generates the print function information in the XML file as shown in FIG. 17.

Next, the communication unit 301 transmits a print-function restriction information request to the printer control server 200 (Step S1516). It is noted that the print-function restriction information request includes any one of the printer ID, the user ID, and the client ID, or a combination of a plurality of IDs among the printer ID, the user ID, and the client ID.

In the printer control server 200, the communication unit 201 receives the print-function restriction information request from the print server 300 (Step S1517). The printer control server 200 acquires print-function restriction information corresponding to the printer ID from the printer-specific print-function restriction information DB 250 (Step S1518). When the print-function restriction information request includes the user ID in addition to the printer ID, the printer control server 200 acquires the print-function restriction information from the user-specific print-function restriction information DB 260 and the group-specific print-function restriction information DB 270. Furthermore, when the print-function restriction information request includes the client ID, the printer control server 200 first acquires a client type corresponding to the client ID from the client information DB 240, and then acquires print-function restriction information corresponding to the acquired client type from the client-type print-function restriction information DB 280. The communication unit 201 transmits the print-function restriction information to the print server 300 (Step S1519).

In the print server 300, the communication unit 301 receives the print-function restriction information (Step S1520). The print data generating unit 303 generates print function information reflecting the print-function restriction information (Step S1521). FIG. 18 is a schematic for explaining an example of print function information reflecting the print-function restriction information. When "duplex priority" and "up to 50" are set as the print-function restriction information, the maximum number of copies is 50 copies and the initial value is 50 copies as shown in FIG. 18. Further, when the restriction is not necessarily applied such as "duplex priority" for the sides, the previous set value may be put ahead of the print-function restriction information. The print-setting-screen information generating unit 302 converts the print function information to the print-setting-screen information (Step S1522). Specifically, the print-setting-screen information generating unit 302 converts the print function information to the data format of the print-setting-screen information included in the print-setting-screen information request received from the client device 100. It is noted that the print-setting-screen information corresponding to the printer ID may be stored in a storage unit (not shown), and the print-setting-screen information generating unit 302 may acquire the print-setting-screen information corresponding to the printer ID from the storage unit. FIG. 19 is a schematic for explaining an example of the print-setting-screen information. FIG. 19 shows an example of the print-setting-screen information when the data-format information is HyperText Markup Language (HTML). The communication unit 301 transmits the print-setting-screen information to the client device 100 (Step S1523).

Figure 20:
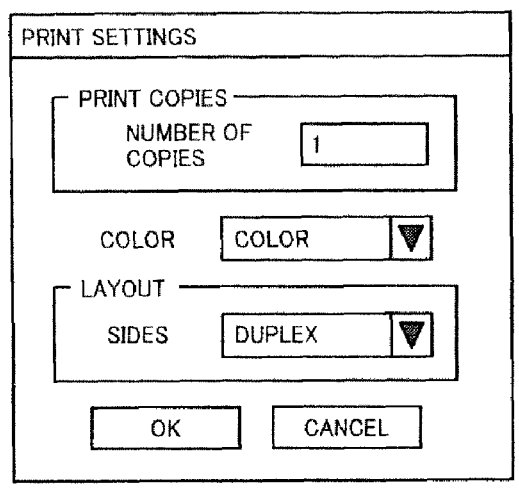
FIG. 20 is depicts an example of a print setting screen displayed on an operation display unit.

In the client device 100, the communication unit 101 receives the print-setting-screen information from the print server 300 (Step S1524). The operation display controller 103 displays the print setting screen generated from the print-setting-screen information on the operation display unit 102 (Step S1525). FIG. 20 is a schematic for explaining an example of the print setting screen displayed on the operation display unit 102. FIG. 20 shows the print setting screen generated from the print-setting-screen information shown in FIG. 19. The operation display controller 103 receives a print set value entered through the print setting screen displayed on the operation display unit 102 (Step S1526). The communication unit 101 transmits the intermediate data and the set value to the print server 300 (Step S1527).

In the print server 300, the communication unit 301 receives the intermediate data and the set value from the client device 100 (Step S1528). The print-set-value determination unit 305 determines whether the received set value is within the range of the print-function restriction information (Steps S1529 to S1530), and further determines whether the set value has an exclusive relation to a plurality of print-function restriction information.

The determination of the set value is performed by the print server 300 as a rule. However, when the client device 100 can execute JavaScript, the client device 100 can determine the set value. For example, as shown in FIG. 19, the operation display controller 103 can also determine the print set value received on the print setting screen using a determination process described in JavaScript. In the example of FIG. 19, when a value of "50" or more is entered in "number of copies", the operation display controller 103 displays a message of "printing is restricted to less than 50 copies" on the print setting screen. The operation display controller 103 may also determine a set value while the user is entering the set value in the print item.

In the print server 300, the print-set-value determination unit 305 may determine the set value using a technique such as Asynchronous JavaScript®+XML (Ajax) while the set value is being entered in the print item.

In the print server 300, when the print-set-value determination unit 305 determines that the set value is within the range of the print-function restriction information (YES at Step S1530), the process proceeds to Step S1540. When it is determined that the set value is not within the range thereof (NO at Step S1530), the print-set-value determination unit 305 generates the alert screen information (Step S1531). The communication unit 301 transmits the alert screen information to the client device 100 (Step S1532).

Figure 21:
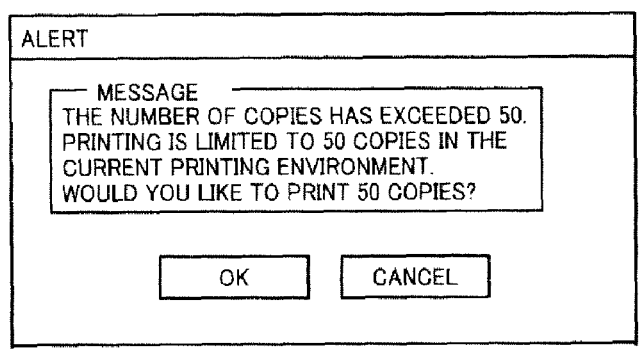
FIG. 21 depicts an example of an alert screen.

In the client device 100, the communication unit 101 receives the alert screen information from the print server 300 (Step S1533). The operation display controller 103 displays alert information generated from the alert screen information on the operation display unit 102 (Step S1534). FIG. 21 is a schematic for explaining an example of the alert screen. When the number of copies exceeds the upper limit, the operation display controller 103 prompts the user to enter either one of "OK" indicating continuation of the printing process or "Cancel" indicating cancellation of the printing process. The operation display controller 103 receives an entry of the content of the instruction (Step S1535). Specifically, in the example shown in FIG. 21, the operation display controller 103 receives either one of "OK" or "Cancel". The communication unit 101 transmits the content of the instruction to the print server 300 (Step S1536).

In the print server 300, the communication unit 301 receives the content of the instruction from the client device 100 (Step S1537). The print control unit 304 determines whether the printing process is continued, from the received content of the instruction (Step S1538). When it is determined that the printing process is not continued (NO at Step S1538), the process is ended. When it is determined that the printing process is continued (YES at Step S1538), the set value is changed (Step S1539). Specifically, the print control unit 304 selects any set value that is within the range of the print-function restriction information and is not excluded. For example, when the number of copies can be set up to 50 as the print-function restriction information and if 60 is set, the value may be changed to 50 which is the closest to the set value of the number of copies which can be set, or may be changed to a default value, for example, 1. The print data generating unit 303 generates print data from the intermediate data and the set value (Step S1540). The communication unit 301 transmits the print data to the printer 400 corresponding to the printer ID (Step S1541).

In the printer 400, the communication unit 401 receives the print data (Step S1542), and the printing unit 402 prints the print data (Step S1543).

As explained above, by generating the print-setting-screen information to create the print setting screen from the print function information and the print-function restriction information set for each printer and each user stored in the printer control server 200 and the print server 300, it is possible to display the print setting screen reflecting the restrictions of the print functions for each printer specified by the client device 100 and for each user who issues a print instruction. Thus, the restrictions for the printing can reliably be executed.

Because the print-setting-screen information is generated from the print function information and the print-function restriction information integrally managed by the printer control server 200 and the print server 300 respectively, setting is not necessary in each client device 100, which allows reduction in the load of maintaining the information for restricting the print functions.

Furthermore, because the client device 100 does not generate the print data, there is no need to install printer driver, in each client device, corresponding to each printer that can be specified, and this allows reduction in the load of maintenance when a new printer 400 is connected, so that space for the file required in the client device 100 can be reduced.

When the printing system 10 includes an authentication device and performs authentication upon opening a session, a session ID for identifying a session may be used instead of the user ID and the client ID.

Figure 22:
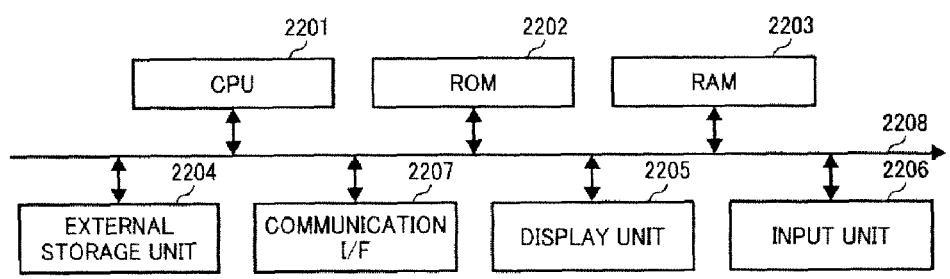
FIG. 22 is a block diagram for explaining an example of a hardware configuration of the client device according to the first embodiment.

FIG. 22 is a block diagram for explaining an example of a hardware configuration of the client device 100 according to the first embodiment. It is noted that the respective hardware configurations of the printer control server 200 and the print server 300 are identical to that of the client device 100. Therefore, the hardware configuration of the client device 100 is explained, but explanation of the hardware configurations of the printer control server 200 and the print server 300 is omitted. Each client device 100 according to the first embodiment has a hardware configuration using an ordinary computer, which includes a control unit such as a central processing unit (CPU) 2201; a storage unit such as a read only memory (ROM) 2202 and a random access memory (RAM)

2203; an external storage unit 2204 such as a hard disk drive (HDD) and a compact disk (CD) drive; a display unit 2205 such as a display; an input unit 2206 such as a keyboard and a mouse; a communication interface (I/F) 2207 that performs communication with other devices; and a bus 2208 connecting these units.

Programs executed by the client device 100, the printer control server 200, and the print server 300 according to the first embodiment are provided by being recorded in a computer-readable recording medium such as a compact disk read only memory (CD-ROM), a flexible disk (FD), a compact disk recordable (CD-R), and a digital versatile disk (DVD) in a file with an installable format or an executable format.

Further, the programs executed by the client device 100, the printer control server 200, and the print server 300 according to the first embodiment may be provided by being stored on a computer connected to a network such as the Internet and causing the programs to be downloaded through the network. The programs executed by the client device 100, the printer control server 200, and the print server 300 according to the first embodiment may be provided or distributed through a network such as the Internet. Furthermore, the programs according to the first embodiment may be provided by being previously incorporated into the ROM or the like.

The programs executed by the client device 100, the printer control server 200, and the print server 300 according to the first embodiment are configured with modules including the components, for example, the communication unit, the operation display controller, and the intermediate data generating unit. As actual hardware, the CPU (processor) reads the programs from the storage medium and executes them, and the components are thereby loaded on a main storage unit, so that the communication unit, the operation display controller, and the intermediate data generating unit or the like are generated on the main storage unit.

It is noted that the application-data storage unit 110 can be formed with any generally used storage medium such as a hard disk drive (HDD), an optical disc, and a memory card.

A second embodiment of the present invention is explained below with reference to the accompanying drawings. In a configuration example of a printing system according to the second embodiment, only a different portion from the first embodiment is explained. When components included in the printing system according to the second embodiment have the same reference numerals as these of the first embodiment, the components are identical to these of the first embodiment. Thus, explanation thereof is omitted.

Figure 23:
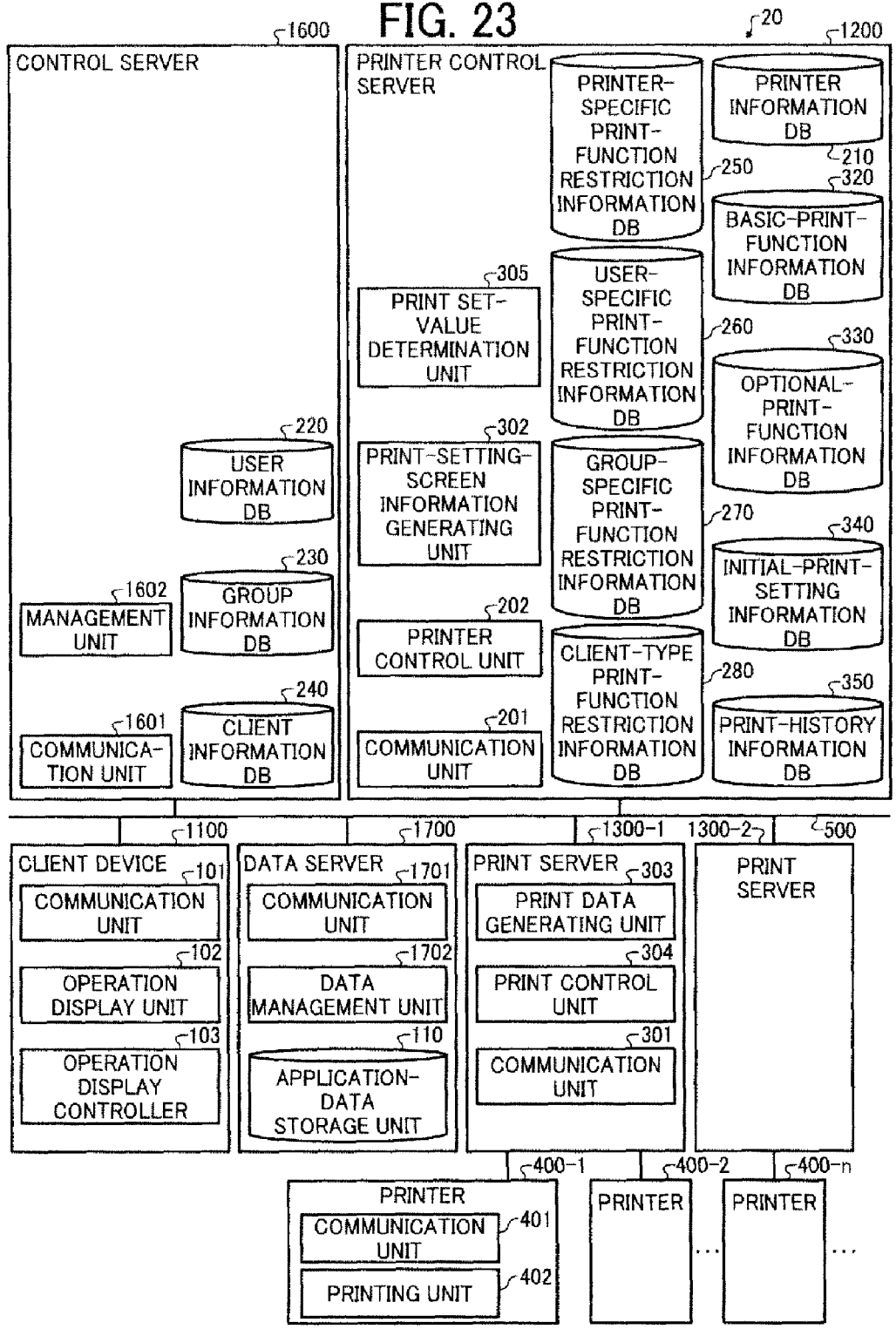
FIG. 23 is a block diagram of a printing system according to a second embodiment of the present invention.

FIG. 23 is a block diagram of a printing system 20 according to the second embodiment. The printing system 20 includes a client device 1100, a data server 1700, a control server 1600, a printer control server 1200, print servers 1300-1 and 1300-2 (hereinafter, "print server 1300"), and the printer 400. The client device 1100, the data server 1700, the control server 1600, the printer control server 1200, and the print server 1300 are connected to each other through the network 500. The print server 1300 and the printer 400 may be connected to each other through the cable or the like, or may be connected through a network such as LAN.

The client device 1100 includes the communication unit 101, the operation display unit 102, and the operation display controller 103. The configuration and functions of these components with the same reference numerals as these of the first embodiment are identical to these of the first embodiment, and thus, explanation thereof is omitted. Hereafter, when the other components have the same reference numerals as these of the first embodiment, explanation thereof is omitted for the same reason.

The data server 1700 includes a communication unit 1701, a data management unit 1702, and the application-data storage unit 110. The communication unit 1701 receives an application-data transmission request specifying URI of application data sent from the client device 1100 and the print server 1300, and transmits the application data for the received application-data transmission request to the URI. The data management unit 1702 manages data stored in the application-data storage unit 110.

The control server 1600 includes a communication unit 1601, a management unit 1602, the user information DB 220, the group information DB 230, and the client information DB 240. When the group ID is desired to be acquired from the user ID, the control server 1600 transmits the user ID to the user information DB 220 and acquires the group ID corresponding to the user ID therefrom. Further, when the client type is desired to be acquired from the client ID, the control server 1600 transmits the client ID to the client information DB 240 and acquires the client type corresponding to the client ID therefrom. The communication unit 1601 receives transmission requests for the user information, the group information, and the client information from the client device 1100 and the printer control server 1200 respectively, and transmits each information corresponding to the received transmission requests thereto respectively. The management unit 1602 manages respective information stored in the user information DB 220, the group information DB 230, and the client information DB 240.

The printer control server 1200 includes the communication unit 201, the printer control unit 202, the print-setting-screen information generating unit 302, the print-set-value determination unit 305, the printer-specific print-function restriction information DB 250, the user-specific print-function restriction information DB 260, the group-specific print-function restriction information DB 270, the client-type print-function restriction information DB 280, the printer information DB 210, the basic-print-function information DB 320, the optional-print-function information DB 330, the initial-print-setting information DB 340, and the print-history information DB 350.

The print server 1300 includes the communication unit 301, the print data generating unit 303, and the print control unit 304. The printer 400 includes the communication unit 401 and the printing unit 402.

Figure 24A:
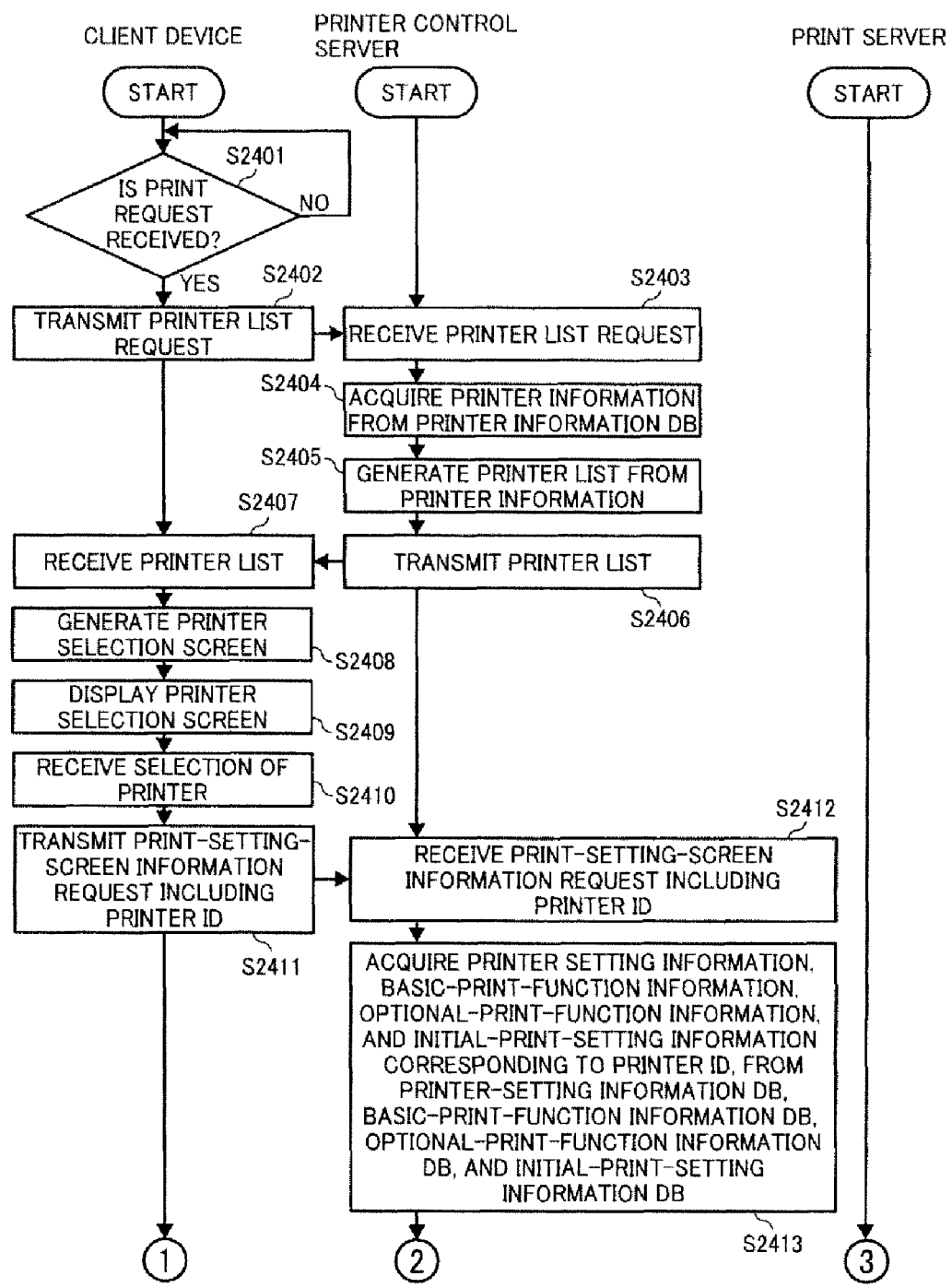
FIGS. 24A to 24C are flowcharts of printing processes performed by a client device, a data server, a printer control server, a print server, and a printer.
Figure 24B:
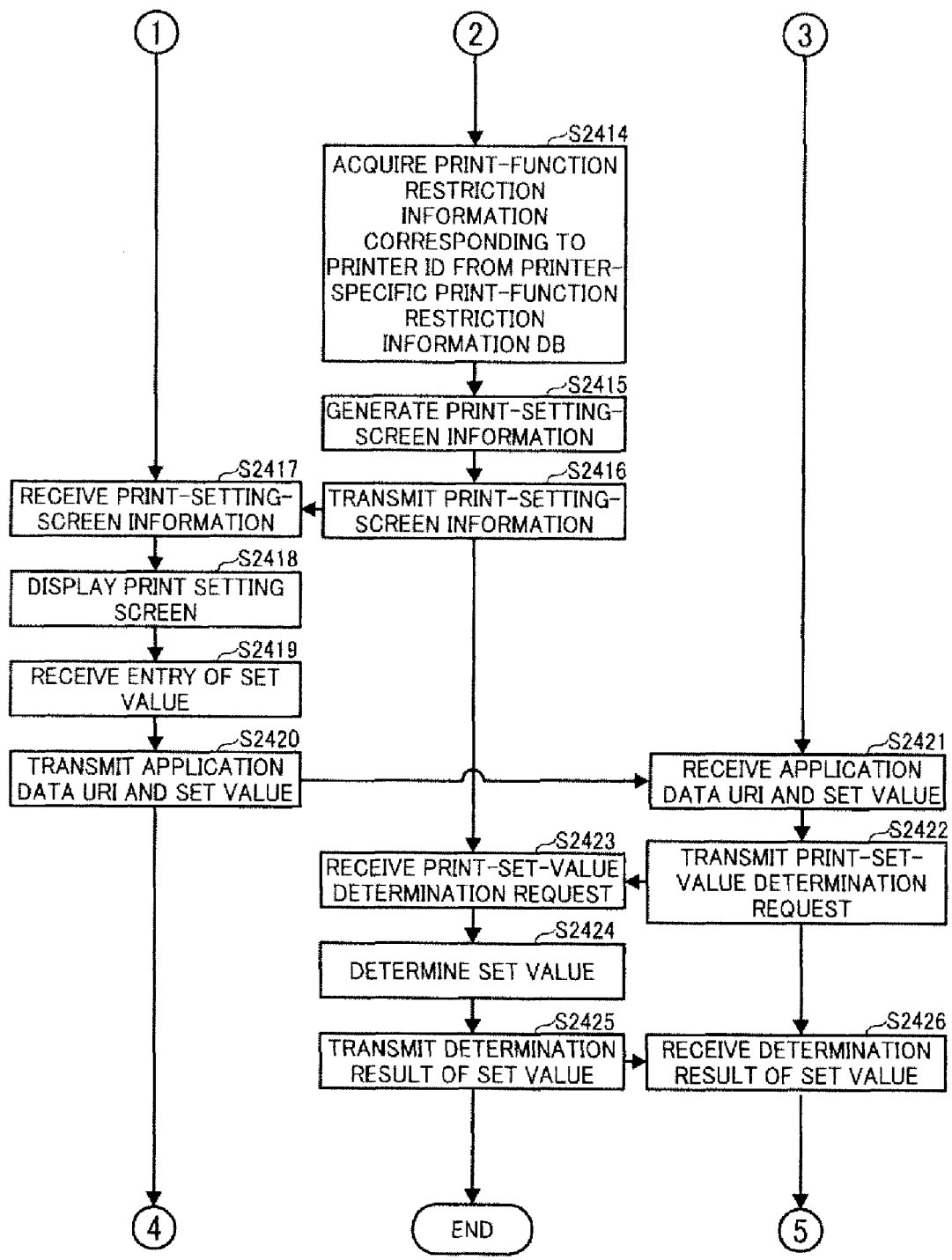
Figure 24C:
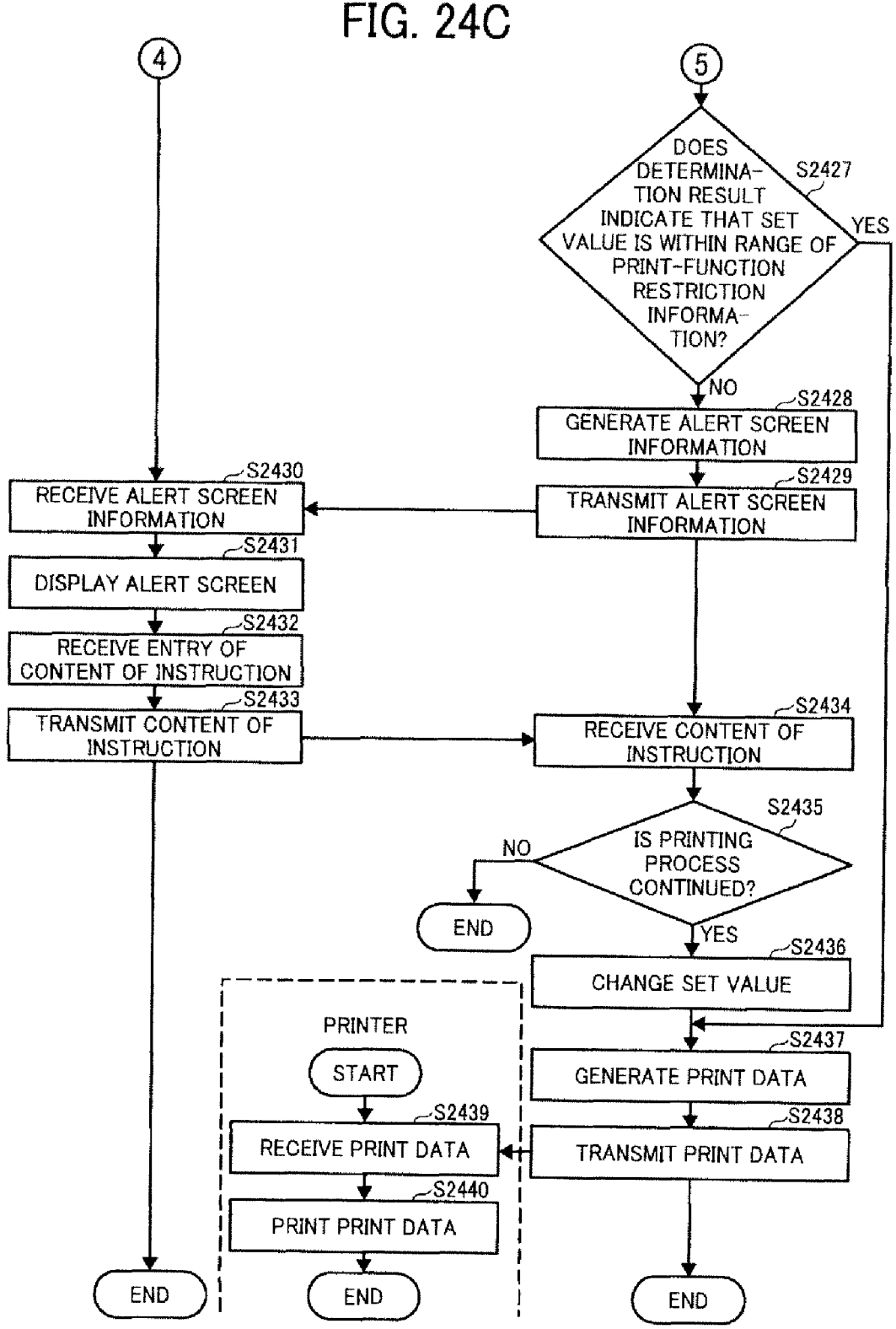

Next, the printing process performed by the printing system 20 configured in the above manner is explained below. FIGS. 24A to 24C are flowcharts of printing processes performed by the client device 1100, the data server 1700, the printer control server 1200, the print server 1300, and the printer 400. In the client device 1100, it is assumed that an application program is executed, and that application data specified by the application program is displayed on the operation display unit 102 or that the URI of the application data on the data server 1700 is specified.

In the client device 1100, the operation display unit 102 determines whether the print request is received (Step S2401). When it is determined that the print request is not received (NO at Step S2401), the process control returns to Step S2401. When it is determined that the print request is received (YES at Step S2401), the communication unit 101 transmits a printer list request for requesting a list of printers that can be specified, to the printer control server 1200 (Step S2402).

In the printer control server 1200, the communication unit 201 receives the printer list request (Step S2403). The printer control unit 202 acquires printer information from the printer information DB 210 (Step S2404). The printer control unit 202 generates a printer list from the acquired printer information (Step S2405). The communication unit 201 transmits the generated printer list to the client device 1100 (Step S2406).

In the client device 1100, the communication unit 101 receives the printer list from the printer control server 1200 (Step S2407). The operation display controller 103 generates a printer selection screen (Step S2408), and displays the printer selection screen on the operation display unit 102 (Step S2409). Model names are displayed on the printer selection screen and any one of them is selected, and the printer ID and the print server URI corresponding to the model name are thereby acquired. The operation display controller 103 receives the selection of the printer (Step S2410). The communication unit 101 transmits a print-setting-screen information request including the printer ID to the printer control server 1200 (Step S2411). It is noted that the print-setting-screen information request includes data-format information for the print-setting-screen information.

In the printer control server 1200, the communication unit 201 receives the print-setting-screen information request including the printer ID (Step S2412). The printer control unit 202 acquires printer setting information, basic-print-function information, optional-print-function information, and initial-print-setting information corresponding to the printer ID from the printer-setting information DB 310, the basic-print-function information DB 320, the optional-print-function information DB 330, and the initial-print-setting information DB 340 (Step S2413). The printer control unit 202 acquires print-function restriction information corresponding to the printer ID from the printer-specific print-function restriction information DB 250 (Step S2414). The print-setting-screen information generating unit 302 generates print-setting-screen information from the printer setting information, the basic-print-function information, the optional-print-function information, the initial-print-setting information, and the print-function restriction information (Step S2415). FIG. 25 is a schematic for explaining an example of the print-setting-screen information. The communication unit 201 transmits the print-setting-screen information to the client device 1100 (Step S2416).

In the client device 1100, the communication unit 101 receives the print-setting-screen information from the printer control server 1200 (Step S2417). The operation display controller 103 displays the print setting screen generated from the print-setting-screen information on the operation display unit 102 (Step S2418). The operation display controller 103 receives a set value entered through the print setting screen displayed on the operation display unit 102 (Step S2419). The communication unit 101 transmits the URI of the application data and the set value to the print server 1300 (Step S2420).

In the print server 1300, the communication unit 301 receives the URI of the application data and the set value from the client device 1100 (Step S2421). The communication unit 301 transmits a print-set-value determination request to the printer control server 1200 (Step S2422).

In the printer control server 1200, the communication unit 201 receives the print-set-value determination request (Step S2423). The print-set-value determination request includes the set value. The print-set-value determination unit 305 determines whether the received set value is within the range of the print-function restriction information (Steps S2424), and further determines whether the set value has an exclusive relation to a plurality of print-function restriction information. The determination process of the set value performed by the printer control server 1200 or the client device 1100 is the same as that performed by the printer server 300 or the client device 100, and thus description thereof is omitted. The communication unit 201 transmits the determination result of the set value to the print server 1300 (Step S2425).

In the print server 1300, the communication unit 301 receives the determination result of the set value from the printer control server 1200 (Step S2426). The print control unit 304 determines whether the received determination result indicates that the set value is within the range of the print-function restriction information (Step S2427). Hereinafter, the processes at Step S2427 to Step S2440 are identical to these at Step S1530 to Step S1543 in FIG. 15C, and, therefore, explanation thereof is omitted.

Thus, by storing the application data not in the client device 1100 but in the data server 1700, a storage unit that stores therein the application data does not need to be provided in the client device 1100, so that printing can be instructed even from the client device 1100 such as a mobile phone which is not provided with a large-capacity storage.

As explained above, the present invention is explained using the first and the second embodiments, however, various modifications or improvements can be added to the embodiments. Moreover, the configurations and the functions explained in the first and the second embodiments can be freely combined with each other.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server apparatus that is connectable to a client device via a network, the client device being connectable to a printer via a network, the server apparatus comprising:
   a print-function storage unit that stores therein in associated manner, for each particular printer of one or more printers, first printer identification information to uniquely identify the particular printer and first print function information including a set value for a print item that can be set for the particular printer;
   a function-restriction storage unit that stores therein first function restriction information indicating an allowable range of values of the set value;
   a first receiving unit that receives a transmission request and second printer identification information from the client device, the transmission request being a request for transmitting setting screen information to the client device, the second printer identification information being information to uniquely identify a specific printer, the client device being a device that receives (A) input of a print instruction for printing certain data on the specific printer and (B) input of a set value for a print item;
   an acquiring unit that acquires second print function information corresponding to the second printer identification information, from among the first print function information stored in the print-function storage unit, and acquires second function restriction information from among the first function restriction information stored in the function-restriction storage unit, in response to the transmission request received by the first receiving unit from the client device;
   a screen generating unit that generates setting screen information, based on the second print function information and the second function restriction information; and
   a first transmitting unit that transmits the setting screen information generated by the screen generating unit, to the client device; and a print-set-value determination unit that receives from the client device the set value of the print item, received by the client device through a setting screen provided by the client device based on the setting screen information received by the client device from the screen generating unit, wherein the print-set-value determination unit determines whether the set value received from the client device is within the allowable range of values of the print item, as indicated in the first function restriction information, and in a case that the print-set-value determination unit determines that the set value received from the client device is outside the allowable range of values, the print-set-value determination unit causes the screen generating unit to generate alert screen information indicating that the set value is outside the allowable range of values and requesting confirmation that print process corresponding to the print instruction is to proceed, and if and when the confirmation that the print process corresponding to the print instruction is to proceed is received from the client device, the print-set-value determination unit changes the set value to another value which is within the allowable range of values to the print item, and print data is generated with the print item set to said another value which is within the allowable range of values.

2. The server apparatus according to claim 1, wherein
the function-restriction storage unit stores therein in associated manner, for said each particular printer of the one or more printers, the first printer identification information and the first function restriction information,
the acquiring unit acquires the second function restriction information corresponding to the second printer identification information, from among the first function restriction information stored in the function-restriction storage unit, and
the screen generating unit generates the setting screen information, based on the second print function information and the second function restriction information.

3. The server apparatus according to claim 1, further comprising a user-information storage unit that stores therein in associated manner, for each particular user of one or more users, first user identification information to uniquely identify the particular user and first group identification information to uniquely identify a group to which the particular user belongs, wherein
the transmission request received by the first receiving unit contains second user identification information,
the function-restriction storage unit stores therein in associated manner, for each group of one or more groups, the first group identification information and the first function restriction information,
the acquiring unit acquires second group identification information corresponding to the second user identification information, from among the first group identification information stored in the user-information storage unit, and acquires second function restriction information corresponding to the second group identification information, from among the first function restriction information stored in the function-restriction storage unit, and
the screen generating unit generates the setting screen information, based on the second print function information and the second function restriction information.

4. The server apparatus according to claim 1, further comprising:
a printer-information storage unit that stores therein in associated manner, for said each particular printer of the one or more printers, the first printer identification information and first printer type information indicating a type of the particular printer; and
a printer-function storage unit that stores therein in associated manner, for said each particular printer of the one or more printers, the first printer type information and first printer function information indicating a function available in the particular printer, wherein
the acquiring unit acquires second printer type information corresponding to the second printer identification information, from among the first printer type information stored in the printer-information storage unit, and acquires second printer function information corresponding to the second printer type information, from among the first printer function information stored in the printer-function storage unit, and
the screen generating unit generates the setting screen information based on the second printer function information.

5. The server apparatus according to claim 1, further comprising an initial-setting storage unit that stores therein in associated manner, for each particular print item of one or more print items, the first printer identification information and first initial set values corresponding to the particular print item, wherein
the acquiring unit acquires a second initial set value corresponding to the second printer identification information, from among the first initial set values stored in the initial-setting storage unit, and
the screen generating unit generates the setting screen information in which the second initial set value is set.

6. The server apparatus according to claim 1, further comprising a setting-screen-information storage unit that stores therein in associated manner, for said each particular printer of the one or more printers, the first printer identification information and the setting screen information, wherein
the first transmitting unit transmits setting screen information that corresponds to the second printer identification information to the client device, from among the setting screen information stored in the setting-screen-information storage unit.

7. A print-item setting method performed in a printing system that includes a printer connectable via a network, a client device that receives (i) input of a print instruction to print certain data on the printer connected to the client device via the network and (ii) input of a set value for a print item, and a server apparatus connectable to the client device via the network, the server apparatus including
a print-function storage unit that stores therein in associated manner, for each particular printer of one or more printers, first printer identification information to uniquely identify the particular printer and first print function information including a set value for a print item that can be set for the particular printer, and
a function-restriction storage unit that stores therein first function restriction information indicating an allowable range of values of the set value,
the print-item setting method comprising:
(a) receiving, in the server apparatus, a transmission request and second printer identification information from the client device, the transmission request being a request for transmitting setting screen information to be used to display a screen for setting the set value;
(b) acquiring, in the server apparatus, second print function information corresponding to the second printer identification information, from among the first print function information stored in the print-function storage unit, and acquiring second function restriction information from among the first function restriction information stored in the function-restriction storage unit, in response to the transmission request received in (a);

(c) generating, in the server apparatus, setting screen information based on the second print function information and the second function restriction information;

(d) transmitting the setting screen information generated in (c) from the server apparatus to the client device;

(e) receiving, in the client device, the setting screen information from the server apparatus;

(f) displaying, by the client device, a setting screen using the setting screen information received in (e);

(g) receiving input of a set value corresponding to the print item, through the setting screen displayed by the client device in (f);

(h) transmitting from the client device, and receiving by the server apparatus, the set value of the print item, received in (g);

(h1) determining, by the server apparatus, whether the set value of the print item, received from the client device in (h), is within the allowable range of values of the print item, as indicated in the first function restriction information;

(h2) causing, in a case that it is determined in (h1) that the set value received from the client device is outside the allowable range of values, the client device to generate an alert screen indicating that the set value is outside the allowable range of values and requesting confirmation that print process corresponding to the print instruction is to proceed;

(h3) changing, in a case that the confirmation requested in (h2) is received, the set value to another value which is within the allowable range of values to the print item, and generating print data with the print item set to said another value which is within the allowable range of values.

8. The print-item setting method according to claim 7, further comprising:
   (i1) transmitting, from the client device to the server apparatus, an address of application data which is an object to be printed;
   (i2) receiving, in the server apparatus, the address from the client device;
   (j) acquiring, in the server apparatus, the application data stored at the address received in (i2);
   (k) generating, in the server apparatus, print data based on the set value and the application data acquired in (j);
   (l) transmitting the print data generated in (k), from the server apparatus to a printer corresponding to the second printer identification information.

9. The print-item setting method according to claim 8, further comprising:
   (m) generating, in the client device, intermediate data in a general-purpose data format from the application data;
   (n) transmitting the intermediate data from the client device to the server apparatus;
   (o) receiving, by the server apparatus, the intermediate data from the client device; and
   (p) generating, in the server apparatus, the print data based on the set value and the intermediate data received in (o).

10. The print-item setting method according to claim 8, wherein the printing system further includes a data server device that is connectable to the client device via a network and stores therein the application data, and wherein the print-item setting method further comprises:

(q) transmitting an address of the application data in the network, from the client device to the server apparatus;
(r) receiving, by the server apparatus, the address from the client device; and
(s) generating, by the server apparatus, the print data based on application data indicated by the set value and the address received in (r).

11. The print-item setting method according to claim 7, wherein the server apparatus further includes a function-restriction storage unit that stores therein in associated manner, for each particular user of one or more users, first user identification information to uniquely identify the particular user who uses the client device and the first function restriction information, and wherein the print-item setting method further comprises:
   (t) acquiring, in the client device, second user identification information;
   (u) transmitting the second user identification information, from the client device to the server apparatus;
   (v) receiving the second user identification information, by the server apparatus from the client device;
   (w) acquiring second function restriction information corresponding to the second user identification information received in (v), from among the first function restriction information stored in the function-restriction storage unit; and
   (x) generating the setting screen information based on the second print function information and the second function restriction information.

12. The print-item setting method according to claim 7, wherein the server apparatus further includes
   a client-information storage unit that stores therein in associated manner, for each particular client device of one or more client devices, first client identification information to uniquely identify the particular client device and first client type information for identifying a type of the particular client device, and
   a client-type storage unit that stores therein in associated manner the first client type information and the first function restriction information, and wherein the print-item setting method further comprises:
   transmitting second client identification information, from the client device to the server apparatus;
   receiving the second client identification information, by the server apparatus from the client device;
   acquiring, by the server apparatus, second client type information corresponding to the second client identification information, from among the first client type information stored in the client-information storage unit, and acquiring second function restriction information corresponding to the second client type information, from among the first function restriction information stored in the client-type storage unit; and
   generating, in the server apparatus, the setting screen information based on the second print function information and the second function restriction information.

13. The print-item setting method according to claim 11, wherein the server apparatus further includes a history-information storage unit that stores therein in associated manner the first user identification information and the set value set for the print item, wherein the print-item setting method further comprises:
   (y) acquiring, by the server apparatus from the history-information storage unit, a previous set value that corresponds to the second user identification information received in (v); and (z) generating, by the server apparatus, the setting screen information based on the previous set value acquired in (y).

14. The print-item setting method according to claim 7, further comprising:
(aa) acquiring, by the client device, a display format of the setting screen;
(bb) transmitting the display format, from the client device to the server apparatus;
(cc) receiving the display format, by the server apparatus from the client device; and
(dd) generating, by the server apparatus, the setting screen information based on the display format received in (cc).

15. A computer program product that includes a non-transitory computer-readable recording medium that stores therein a computer program, including a plurality of computer-executable instructions, that causes a computer to execute the instructions, the computer including
a print-function storage unit that stores therein in associated manner, for each particular printer of one or more printers, first printer identification information to uniquely identify the particular printer and first print function information including a set value for a print item that can be set for the particular printer; and
a function-restriction storage unit that stores therein first function restriction information indicating an allowable range of values of the set value, and the computer program causing the computer to execute:
(a) receiving a transmission request and second printer identification information from a client device, the transmission request being a request for transmitting setting screen information used to display a screen for setting the set value, the client device being connectable to a specific printer that prints print data through a network, and that receives a print instruction for the specific printer and input of set value for the print item;
(b) acquiring second print function information corresponding to the second printer identification information, from among the first print function information stored in the print-function storage unit, and acquiring second function restriction information from among the first function restriction information stored in the function-restriction storage unit in response to the transmission request received in (a);
(c) generating setting screen information based on the second print function information and the second function restriction information;
(d) transmitting the setting screen information generated in (c), to the client device;
(e) receiving, from the client device, the set value of the print item, received by the client device through the screen for setting the setting value;
(f) determining whether the set value received from the client device in (e) is within the allowable range of values of the print item, as indicated in the first function restriction information;
(g) causing, in a case that it is determined in (f) that the set value received from the client device is outside the allowable range of values, the client device to generate an alert screen indicating that the set value is outside the allowable range of values and requesting confirmation that print process corresponding to the print instruction is to proceed; and
(h) changing, in a case that the confirmation requested in (g) is received, the set value to another value which is within the allowable range of values to the print item, and generating print data with the print item set to said another value which is within the allowable range of values.

16. The computer program product according to claim 15, wherein the function-restriction storage unit stores therein in associated manner, for said each particular printer of the one or more printers, the first printer identification information and the first function restriction information, wherein the computer program causes the computer to further execute:
acquiring the second function restriction information corresponding to the second printer identification information, from among the first function restriction information in the function-restriction storage unit; and
generating the setting screen information based on the second print function information and the second function restriction information.

17. The computer program product according to claim 15, wherein
the computer further includes a user-information storage unit that stores therein in associated manner, for each particular user of one or more users, first user identification information to uniquely identify the particular user, and first group identification information to uniquely identify a group to which the particular user belongs,
the transmission request received at the first receiving unit contains second user identification information, and
the function restriction storage unit stores therein in associated manner, for each particular group of one or more groups, the first group identification information and the first function restriction information, wherein the computer program causes the computer to execute:
acquiring second group identification information corresponding to the second user identification information, from among the first group identification information in the user-information storage unit, and acquiring second function restriction information corresponding to the second group identification information, from among the first function restriction information in the function-restriction storage unit; and
generating setting screen information based on the second print function information and the second function restriction information.

* * * * *